(12) United States Patent
Mallinson et al.

(10) Patent No.: US 9,462,368 B2
(45) Date of Patent: Oct. 4, 2016

(54) DATA INPUT ON AUDIO DEVICE ANALOG OUTPUT PORT

(71) Applicant: ESS Technology, Inc., Milpitas, CA (US)

(72) Inventors: A. Martin Mallinson, Kelowna (CA); Dustin Dale Forman, Kelowna (CA); Robert Lynn Blair, Pleasanton, CA (US); Peter John Frith, Bowness on Windemere (GB)

(73) Assignee: ESS Technology, Inc., Milpitas, CA (US)

( * ) Notice: Subject to any disclaimer, the term of this patent is extended or adjusted under 35 U.S.C. 154(b) by 0 days.

(21) Appl. No.: 14/920,791

(22) Filed: Oct. 22, 2015

(65) Prior Publication Data

US 2016/0119710 A1    Apr. 28, 2016

Related U.S. Application Data

(60) Provisional application No. 62/066,895, filed on Oct. 22, 2014, provisional application No. 62/066,897, filed on Oct. 22, 2014, provisional application No. 62/066,901, filed on Oct. 22, 2014.

(51) Int. Cl.
*H04R 1/10* (2006.01)
*H04R 29/00* (2006.01)

(52) U.S. Cl.
CPC ......... *H04R 1/1041* (2013.01); *H04R 2420/09* (2013.01)

(58) Field of Classification Search
CPC ...... H03M 1/785; H03M 1/808; H03M 1/66; H03M 3/504; H03M 1/682; H03M 1/765; H02M 2001/009; H03F 2200/507; H04R 1/1041; H04R 2420/09

USPC .......... 341/144, 153, 155; 370/235; 381/74, 381/123, 120, 309, 111, 119, 334, 384, 58, 381/81; 455/337; 710/1, 14
See application file for complete search history.

(56) References Cited

U.S. PATENT DOCUMENTS

| | | |
|---|---|---|
| 6,281,821 B1 | 8/2001 | Rhode et al. |
| 7,579,908 B2 | 8/2009 | Miaille et al. |
| 8,848,947 B2 | 9/2014 | Poulsen |
| 2013/0170659 A1* | 7/2013 | Guanziroli ........... H04R 29/001 381/59 |
| 2014/0003616 A1* | 1/2014 | Johnson ............... H04R 29/001 381/74 |

FOREIGN PATENT DOCUMENTS

WO        WO 99/60719    * 11/1999

* cited by examiner

*Primary Examiner* — Paul S Kim
*Assistant Examiner* — Norman Yu
(74) *Attorney, Agent, or Firm* — Gard & Kaslow LLP

(57) ABSTRACT

An apparatus is disclosed for inputting digital data on the output channel(s) of an audio subsystem in an audio device, without interfering with normal operation of the audio subsystem. The described circuit includes a resistive element in parallel with the expected load device, such as a headphone or speaker. The resistive element receives a modulated digital signal from a data source or a switch, and the instantaneous current through the resistive element due to the modulated digital signal is reflected in a current feedback mechanism of the audio subsystem. Demodulation logic retrieves the digital signal from the current measured by the current feedback mechanism. A capacitor is provided to prevent the current in the resistive element from the digital signal from impacting the average DC current that the feedback mechanism uses to evaluate the load device.

15 Claims, 3 Drawing Sheets

DATA INPUT ON AUDIO DEVICE ANALOG OUTPUT PORT

This application claims priority to Provisional Applications Nos. 62/066,895, 62/066,897, and 62/066,901, all filed Oct. 22, 2014, which are incorporated by reference herein in their entirety.

FIELD OF THE INVENTION

The present invention relates generally to audio devices, and more particularly to the use of an analog output port in such an audio device as an input port.

BACKGROUND OF THE INVENTION

Many devices in use today are capable of outputting audio. These include cell phones, tablets, laptop computers and other mobile devices, desktop computers and others. Such devices typically include an industry-standard analog port that accepts a 3.5 millimeter (mm) plug, sometimes called the "jack plug." (A less common alternative is a port that accepts a 2.5 mm plug.) The analog port is part of an audio subsystem for outputting audio from the audio device (and in some cases inputting audio into the device), and typically contains two output channels so as to be capable of providing stereo audio output.

A typical headphone to be used with an audio device is an analog output device that includes a plug that fits into the analog port and one or more earpieces. The term "headphone" includes both over-ear devices that are often referred to as "headphones," as well as in-ear devices that are often called "ear buds," which often have one earpiece for each channel of a stereo audio output.

Output audio is sent from the audio device by the audio subsystem to the earpiece(s) in the headphone so that a user may listen to the audio output. If the headphone includes two earpieces and the source material has been recorded in a stereo format, one channel will go to each earpiece and the user will hear stereo audio output. Other devices, such as some speakers and amplifiers, may also have a plug that fits into the analog port to receive the output audio.

The use of the analog port is often considered to be advantageous inasmuch as it is simple, easy to use and has become a universal standard. It is also free from license fees, unlike, for example, the digital port on an iPhone® from Apple.

In some cases, is it desirable to provide input to the audio device. The analog subsystem of an audio device typically also has an input channel as part of the analog audio port, but one which only allows for analog audio input. For example, some headphones include a microphone as well as the earpieces so that the user may take part in a telephone call without holding the cell phone up to his ear to hear, or to his mouth to talk. However, such microphones only accept audio input, i.e., the user's voice or other sounds in the vicinity of the microphone, which is received by the audio device on the input channel of the analog audio port.

In addition, in some situations the audio subsystem outputting audio may also simultaneously receive as input external audio received by the headphone itself, if the system is a "hybrid" system. The "hybrid system" has been a well-known feature of the public telephone system for many years. In such a system, the same two wires may carry analog signals in both directions; see, e.g., U.S. Pat. No. 3,180,937.

The transducers in the earpieces of a headphone are activated by signals from the audio device. However, the transducers also respond to air pressure created by sound waves in the area of the earpieces, and create an analog electrical signal in response to that pressure, just as a microphone does. Thus, in the case of an audio device, the wires from the device to the headphone may carry both analog output to the headphone and analog input back from the headphone.

However, even if a headphone is part of a hybrid system and the earpiece of the headphone is able to detect sound waves reaching the earpiece from sources other than the audio device, only audio input will be transmitted back to the device. There appear to be no known instances of a hybrid system carrying any input other than audio.

Some new applications for use on some audio devices also input data to the cell phone through the analog port. One example is the Square Reader from Square, Inc., of San Francisco, Calif., which allows credit cards to be "swiped," and the cardholder charged, by passing the data from the chip or magnetic stripe on a credit card through an application on a cell phone, tablet or other audio device. However, the Square Reader is actually just another example of the known art, as it also converts the credit card data to audio for inputting to the audio device, and thus the data received by the device is still audio input, just as the audio received from a microphone or headphone in the prior art.

Some applications may benefit from additional data acquisition channels, and from inputting data in a format other than analog audio, for example, in a digital format. In some contemplated applications, for example, health-related applications running on an audio device, various types of biometric data may advantageously be delivered to the audio device to be used by the application. As with the Square Reader, some existing applications attempt to accomplish the input of such biometric data by receiving audio as input on the input channel of the audio subsystem.

In order to allow for the inputting of data in a format other than audio, and particularly digital data, it would be advantageous to be able to use the audio subsystem of an audio device as a data acquisition device by allowing digital data to be input on the audio output channel(s), while not interfering with normal operation of the audio subsystem.

SUMMARY OF THE INVENTION

A circuit is disclosed which allows digital data to be input on the analog audio output channels of an audio subsystem of an audio device, while allowing normal operation of the audio subsystem.

One embodiment discloses a circuit for use with an analog audio output subsystem of an audio device, the analog audio output subsystem providing an analog audio signal from an output port to a load device and containing a means for producing a signal representing measured current flow through the load device, the circuit comprising: a resistive element connected to the output port in parallel with the load device such that the signal representing measured current flow through the load device also represents measured current flow through the resistive element; a switch for receiving a modulated digital signal from a data source and causing the current flow through the resistive element such that the current flowing through the resistive element is representative of the modulated digital signal; and logic connected to the means for producing the signal representing measured current flow that demodulates the signal representing measured current flow to recover a digital signal encoded in the modulated digital signal.

Another embodiment discloses a circuit for use with an analog audio output subsystem of an audio device, the analog audio output subsystem providing an analog audio signal from an output port to a load device and containing a means for producing a signal representing measured current flow through the load device, the circuit comprising: a resistive element connected to the output port in parallel with the load device such that the signal representing measured current flow through the load device also represents measured current flow through the resistive element; a switch for producing a modulated digital signal in response to a control signal from a data source, and causing the current flow through the resistive element such that the current flowing through the resistive element is representative of the modulated digital signal; and logic connected to the means for producing the signal representing measured current flow that demodulates the signal representing measured current flow to recover a digital signal encoded in the modulated digital signal.

Still another embodiment discloses a method for use with an analog audio output subsystem of an audio device, the analog audio output subsystem providing an analog audio signal from an output port to a load device and containing a means for producing a signal representing measured current flow in a load device, the method comprising: receiving at the output port a current flowing through a resistive element coupled to the output port in parallel with the load device, the current from the resistive element due to a voltage applied to the resistive element from a data source and representative of a modulated digital signal, such that the signal representing the measured current flow in a load device also represents the measured current flow through the resistive element as well as the current flow through the load device; and demodulating the signal from the signal representing the measured current flow to recover the digital signal.

DETAILED DESCRIPTION OF THE INVENTION

Described herein is a circuit and method for allowing digital data to be input on the output channel(s) of an audio subsystem in an audio device, without interfering with normal operation of the audio subsystem. The described circuit includes a resistive element in parallel with an expected load device, such as a headphone or speaker. The resistive element receives a digital signal from a source, and the instantaneous current through the resistive element due to the digital signal is reflected in a current feedback mechanism of the audio subsystem. A capacitor is provided to prevent the current in the resistive element from the digital signal from impacting the average current that the feedback mechanism uses to evaluate the load device.

As used herein, an "audio device" refers to a device that contains some type of processor and/or memory and is capable of outputting audio. Audio devices include cell phones, tablets, laptop computers and other mobile devices, desktop computers and other devices.

Figure 1:
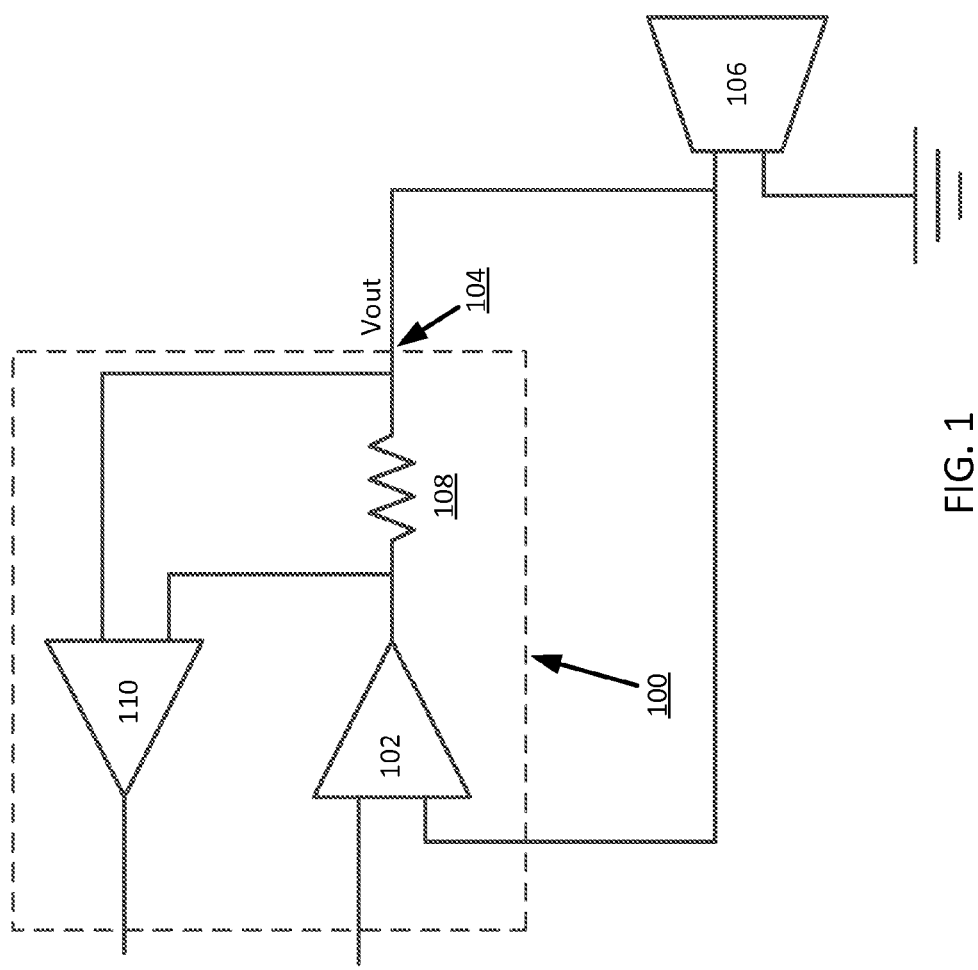
FIG. 1 is a block diagram of a typical prior art audio subsystem that may be used to provide audio output from an audio device.

FIG. 1 is a block diagram of a typical prior art audio subsystem 100 that may be contained within an audio device and used to provide analog audio output from the device. An output amplifier 102 in the audio device provides an analog audio output signal from an analog audio port 104 as a voltage Vout to a load 106 having some resistance. The analog audio output signal will be in the audio frequency range, from approximately 15 to 20,000 hertz.

Load 106 is illustrated as a speaker here. In some cases load 106 may be a speaker fully contained within the audio device, while in other cases load 106 may be a headphone or ear buds as described above, or may alternatively be a speaker or additional amplifier connected to the device through analog audio port 104.

As above, the analog audio port 104 is typically an industry-standard 3.5 mm or 2.5 mm analog jack port, but may in some cases take other forms as well. Although only a single channel and a single output is illustrated here, as typically implemented in the prior art the output of amplifier 102 has two channels, and the industry standard plugs will carry both channels, so that the output signal will contain stereo audio information if the source data contains such stereo information. In such a system there would thus be two instances of what is shown as audio subsystem 100 in FIG. 1.

An audio subsystem in an audio device typically also includes a means to detect the current flowing to the load 106. As illustrated in FIG. 1, audio subsystem 100 includes a first resistive element, here shown as a resistor 108, and a feedback differential amplifier 110 that compares the voltages on either side of resistor 108. Based on Ohm's law, the difference in the voltage across resistor 108 will be the current flowing through resistor 108 multiplied by the value of resistor 108.

Thus, since the current flowing through resistor 108 also flows through the load 106, the signal from differential amplifier 108 allows for determination of the output current for use as will be explained below. In one embodiment, resistor 108 has a resistance of 1 ohm. One of skill in the art will appreciate that other resistive elements may be used in place of resistor 108, for example, an inductor or a field effect transistor (FET). As is known in the art, a feedback loop from the input side of load 106 to amplifier 102 allows the output voltage Vout to the load 106 to be maintained so that any voltage drop across resistor 108 does not affect the operation of the audio subsystem 100 and load 106.

Determining the current flowing through the load 106 allows the audio subsystem in the audio device to perform certain functions with respect to load 106. For example, when a plug is inserted into the analog output port 104 to connect a load 106 to the audio device, audio subsystem 100 will initially measure the average current flowing to load 106. A high current flow to a load 106 indicates that load 106 has a low resistance. This generally indicates that the headphone, speaker or other device connected as load 106 is one of high sensitivity (because sensitivity depends on resistance, at least to a first degree).

In such a case, the audio subsystem 100 may determine that the output voltage should be limited in order to limit the loudness of the sound from the device that is load 106. This may be particularly useful, for example, in the case where load 106 is a headphone, in order to prevent damage to the user's ear(s); some places, e.g., Europe, have regulations requiring such a function.

Another use of this feedback mechanism is the ability to monitor an internal speaker contained in the cell phone or audio device. (In such a case, load 106, i.e., the internal speaker, is also contained within the audio device.) Such internal speakers are generally inefficient and thus require a significant current to produce sound that is loud enough for a user to hear. However, running the speaker continuously raises the temperature of some speaker components, and if the temperature is too high for too long, the speaker may be damaged.

Since it is not practical to measure the temperature of the speaker, the current is used as a surrogate for the temperature, and the current through resistor 108 is again determined as above. In this case, audio subsystem 100 may continuously measure the current flow to the speaker (rather than just initially, as in the case in which a plug is inserted into the analog output port as above). If the speaker is in use and the current is too high for too long, a typical audio subsystem will cause the current to drop, and decrease the sound level, in order to prevent damage to the speaker.

In each of these situations involving "high current," the determination of whether the current is high, and thus whether the audio subsystem should take some action, is not made based upon an instantaneous current level but rather is based upon the average current over some period of time, usually measured in seconds. There may be a transient or short-term current that for shorter periods may exceed the level of "high current" and for which the audio subsystem will not take action. In any event, the audio output signal by which load 106 is driven, and thus the short-term currents from which the average current is derived, will always be in the audio frequency range, i.e., about 15 to 20,000 hertz.

Prior art headphones having microphones often operate within this framework by adding a DC current bias across a piezoelectric device to the output current of the audio device. This current bias is provided by applying a voltage, for example 30 volts, across a resistance. When the user talks, a second resistance is added; the increased resistance drops the voltage across the piezoelectric device by some amount, and thus the current bias changes. However, the audio subsystem is still able to monitor and control the current flow to the load even when the current bias changes.

As above, it may be desirable to use the output mechanism of an audio subsystem in an audio device to input digital data. In doing so, however, it is desirable to not change the average output current, so that normal operation of the audio subsystem as described above is not affected.

In one embodiment of the present approach, data is sent back to the audio device by modulating the instantaneous current consumed by the resistor used to measure the output current, such as resistor 108 of FIG. 1, so that a differential amplifier, such as differential amplifier 110, will produce a signal reflecting the desired data signal.

Figure 2:
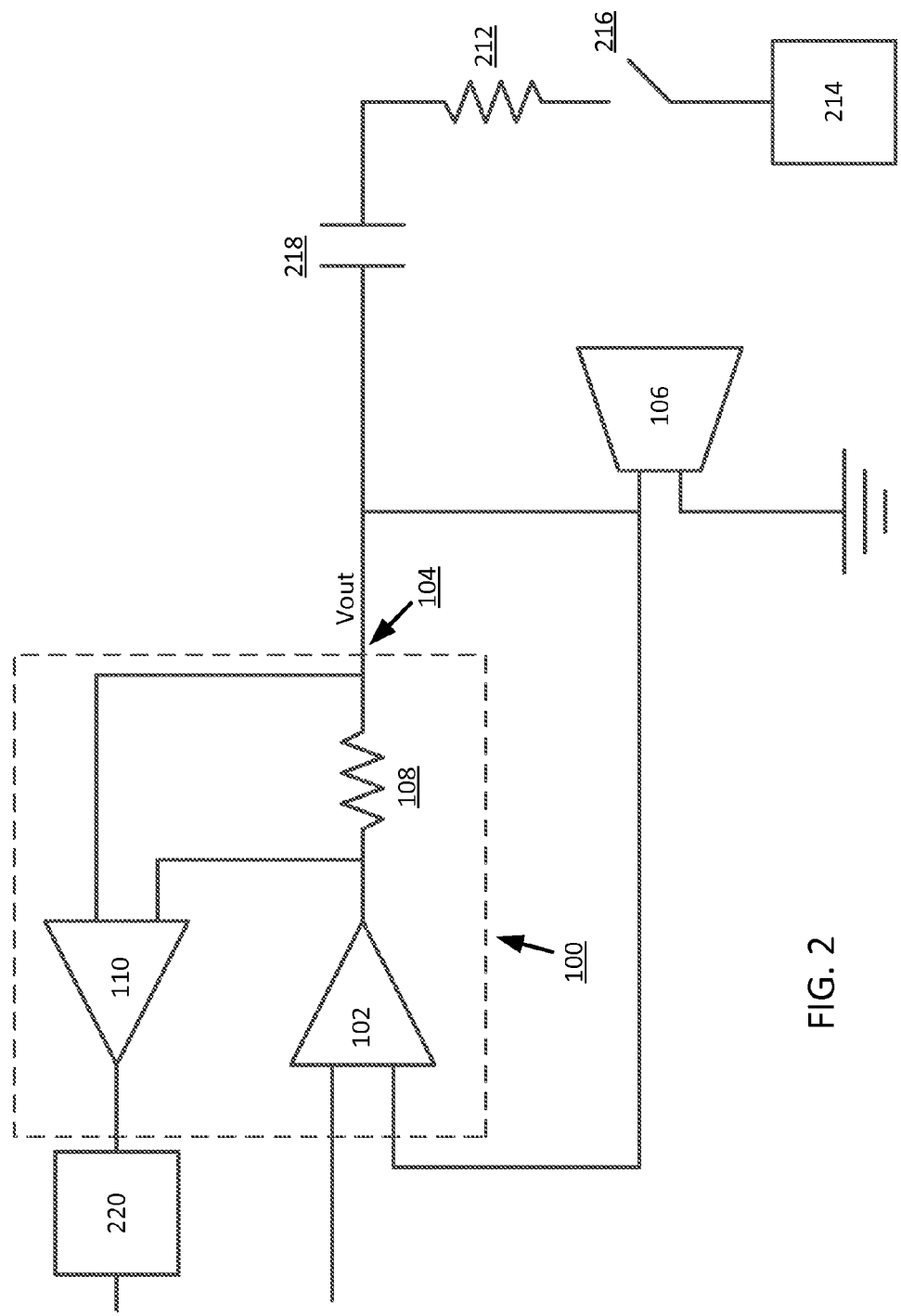
FIG. 2 is a block diagram of an audio subsystem for use in an audio device that allows digital data to be input on the audio output channels according to one embodiment.

FIG. 2 shows one embodiment of a circuit showing how this may be done. As in FIG. 1, in audio subsystem 100, there is an output amplifier 102, load 106, first resistor 108 and feedback differential amplifier 110. These components operate in the same fashion as described above with respect to corresponding elements 102 to 110 in audio subsystem 100 of FIG. 1.

Now, in addition, there is a second resistor 212 coupled to analog output port 104, in parallel with load 106. A data source 214 generates a digital data signal based upon some process, input or measurement. In some embodiments data source 214 modulates the generated digital data signal to create a modulated voltage digital data signal which is then applied to resistor 212 by means of a switch 216. In other embodiments, data source 214 generates a control signal on the connection to switch 216 that causes switch 216 to open and close according to a modulation scheme, such that it is switch 216 that actually performs the modulation of the digital data signal received from data source 214 before applying it to resistor 212. While illustrated as a physical switch, switch 216 may be any means, mechanical or digital, for providing the digital data signal to, and therefore creating a current in, resistor 212, and may be a part of data source 214.

As with resistor 108 above, resistor 212 may also be some other type of resistive element, such as an inductor or FET.

One of skill in the art will appreciate that it is important that resistor 212, or any other resistive element that is used, have a resistance significantly larger than the resistance of load 106 so that placing resistor 212 in parallel with load 106 does not dramatically lower the effective resistance seen by the output voltage Vout and alter the ability of audio subsystem 100 to properly detect load 106 as described above. As headphones typically range in resistance from about 6 ohms to 600 ohms, it is difficult to find a resistance value that will allow the audio subsystem to operate normally with such a wide range of resistances. Thus, the resistance of resistor 212 may be selected to be much larger than the expected resistance of any headphone; in one embodiment resistor 212 has a resistance of 10,000 ohms.

Resistor 212 will only draw current when the switch 216 is in the "closed" position so as to apply the voltage from data source 214 to resistor 212. When resistor 212 draws current, resistor 108 will reflect a change in current due to the fact that resistor 212 is drawing current in addition to the current through load 106. In the present approach, it is expected that the current through resistor 212, which represents data from data source 214, will vary at a much higher rate than the current through load 106, which cannot vary faster than the audio frequency being output from audio subsystem 100 to load 106. Thus, rather than just yielding a signal representing the average current through load 106 as in the prior art, or even a signal at an audio frequency, differential amplifier 110 will now output a signal that also reflects the much faster change in current due to the varying changes in current flow through resistor 212, and thus a signal that contains the data input from data source 214 to resistor 212.

As will be known to those of skill in the art in light of the teachings herein, data source 214 may use a modulation scheme to encode data in a modulated voltage signal which is applied to resistor 212, or may generate a control signal which causes switch 214 to open and close such that switch 214 thereby creates a modulated voltage signal. Since the resulting current flow in resistor 216 is reflected in resistor 108, the signal from differential amplifier 110 which represents the measured current flow may then be decoded by additional logic 220 which demodulates the signal in a way corresponding to the modulation scheme used to encode the data, to recover the digital data produced by data source 214. In some instances, logic 220 may be hard-wired logic in the audio subsystem 100, although it is more likely that the demodulation will be performed by a processor in the audio device under control of an application on the audio device receiving the signal from differential amplifier 110.

Any modulation/demodulation scheme may be contemplated. In one example, data source 214 is an apparatus attached to a headphone to measure the temperature of a runner to prevent overheating. The apparatus might encode the temperature as a frequency, for example, on a scale running from 30 degrees centigrade at 100 kilohertz to 50 degrees at 200 kilohertz. The data signal from the apparatus functions as a control signal that causes switch 216 to be closed at some rate between 100 and 200 kilohertz to allow current to flow through resistor 212, so that switch 216 creates a modulated data signal. This would have no effect on the audio produced by load 106, which depends on the output voltage of audio subsystem 100; rather, the changing load current on resistor 108 caused by the current flow through resistor 212 is detected, rather than voltage, and the frequency measured to determine the temperature of the runner.

As above it is also desirable that the average DC current measured in resistor 108 not change as a result of any current flowing through resistor 212, so that the audio subsystem may properly detect the current flowing through load 106 so as to make appropriate changes when the current is too high as described previously. Thus, it is desirable to isolate resistor 108 from changes in the average current due to current flowing through resistor 212, while letting the average current in load 106, as well as the instantaneous current in resistor 212 which reflects the signal from data source 214, be reflected in the current in resistor 108.

This problem may be solved by placing a capacitor 218 between resistor 212 and resistor 108, and after output port 204, as shown, and by causing the current flow through resistor 212 to be an alternating (AC) current with an average DC value of zero. Capacitor 218 will pass an AC current but not a low frequency current, so that AC current flowing through resistor 212 will pass through, while the average current flowing through the capacitor 218 will be zero. The average current flowing through resistor 108 will thus still be indicative of only the current flowing through the load 106, and not any average or DC current flowing through resistor 212. This allows the logic of the audio subsystem 200 to function appropriately based on a determination of the current flowing through load 106 as described above. One of skill in the art will appreciate that adding capacitor 218 will change the effective resistance seen by analog output port 104, which will no longer merely be the resistance of resistor 212 but the RC constant of resistor 212 and capacitor 218, and will further appreciate that careful selection of the value of capacitor 218 will result in an effective resistance that is still significantly greater than the resistance of load 106 while allowing only current flow changes of high frequency to pass back to output analog port 104 and resistor 108.

On the other hand, the capacitor 218 will pass the near-instantaneous AC changes in current due to the signal passed through resistor 212, and thus will allow information from data source 214 to be passed back to the audio device, since differential amplifier 110 will produce a signal which now includes the changes in current flow through resistor 212 representing the data from data source 214. As long as there is logic such as logic 220 connected to the output of differential amplifier 110 that is capable of performing the demodulation that corresponds to the modulation scheme used by data source 214, or created by switch 216 in response to a control signal, the data from data source 214 may be recovered from the output of differential amplifier 110.

The average current in resistor 212 should have an average DC value of zero so as not to cause capacitor 218 to eventually become fully charged and then pass a DC current value back to resistor 108. Modulation schemes having this characteristic are well known in the art; for example, DVDs are encoded according to such a modulation scheme.

A modulation scheme in which a digital signal of a data stream of high and low voltage values might, for example, be encoded using a three-bit code of voltage values for each data value in the signal, with a high value H represented by voltages 011 applied to resistor 212, and a low value L represented by voltages 001. The high value H will thus have a 66% duty cycle, while the low value L will have a 33% duty cycle. Over a long period the average duty cycle would be expected to be near 50%, as the number of H values will be approximately the same as the number of L values, and thus the number of voltages of 1 will be approximately the same as the number of voltages of 0. Thus, no net DC current would flow through resistor 212. A 5-value data string of 11010, or HHLHL, would be sent as the voltage sequence:

011, 011, 001, 011, 001

If the voltage change runs at 500 kilohertz, the effective data rate of such a 3-bit code will be at about 167 kilohertz, and, as above, rapid changes in current will pass through capacitor 218 and be reflected in resistor 108 on top of the average DC current of load 106. Logic 220 can then include a high pass filter at, for example, 100 kilohertz, to filter the signal from differential amplifier 110 and remove any audio signal, and can then assess the pulse width of the filtered signal to recover the data string.

In some embodiments, data source may contain switch 216. In other embodiments, it may be possible to eliminate switch 216, if data source 214 is itself capable of generating voltages that cause current to flow, or not flow, through resistor 212 in accordance with a selected modulation scheme.

The described method and circuit have several differences from, and advantages over, the prior art. The additional circuitry in FIG. 2 that is not included in audio subsystem 100, i.e., resistor 212, data source 214, switch 216, and capacitor 218 (and possibly demodulation logic 220), are all on the output channel, not on an input channel as in some audio solutions in the prior art. Further, data source 214 can provide any type of digital input, and is not limited to audio input as in the case of a microphone or audio passed back along the output channel from a headphone as in the prior art.

Finally, the additional circuitry does not affect normal operation of the audio subsystem in the audio device, since there is no change to the DC voltage levels seen by the audio device as in some prior art solutions. In essence, the described embodiment sends voltage out to drive the load 106 as in the prior art, but receives changes in current back to get an input signal, rather than having to consider a change in the DC current as in some of the prior art.

Figure 3:
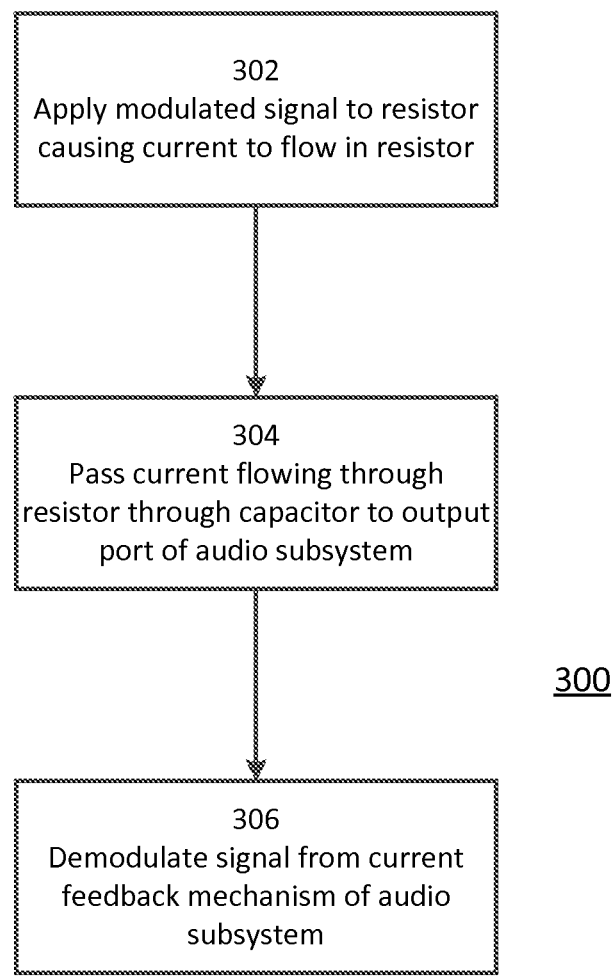
FIG. 3 is a flowchart illustrating a method of inputting digital data on the audio channels of an audio subsystem for use in an audio device.

FIG. 3 is a flowchart of a method 300 of inputting a digital signal into the analog audio output port of an audio device according to one embodiment. In step 302, a modulated voltage digital data signal is applied to one end of a resistive element, such as resistor 212 in FIG. 2, which is coupled to the output port of an audio device in parallel with a load device that is connected to the output port. The modulated digital signal is typically applied to the resistive element by a digital signal source such as data source 214 in FIG. 2, and causes current to flow through the resistive element in a way representing the modulated signal.

In step 304, the current flowing through the resistive element is passed to the output port of the device through a capacitor, such as capacitor 218 in FIG. 2. As explained above, the capacitor allows AC current flowing through resistor 212 to pass through to the output port so that the audio subsystem in the audio device may measure the AC current flowing through resistor 212 without affecting the average current flowing through a load device connected to the output port, which is also measured by the audio subsystem.

As also explained above and as illustrated herein the audio subsystem measures the current flowing through the load device, and the AC current flow through the resistor 212, as shown in FIGS. 1 and 2 above, by measuring the voltage drop across another resistive element, such as resistor 108, connected between an amplifier in the audio subsystem and the output port, with a differential amplifier, such as differential amplifier 110.

In step 306, the output of differential amplifier 110 in FIGS. 1 and 2, which contains the variations in the current flowing through resistor 212, is demodulated to recover the digital signal, by some demodulation logic or the processor on the audio device under control of an application.

As with the circuit of FIG. 2, the described method allows for the entry of digital data on the analog output port of an audio device, without affecting normal operation of the audio subsystem in the audio device.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, the feedback mechanism for measuring the current flowing through the load could be more sophisticated than the resistor connected in series with the output as illustrated by resistor 108 in FIGS. 1 and 2 respectively. One of skill in the art may be able to find other ways of measuring the current flow.

It is also contemplated that any digital data from a data source such as data source 214 of FIG. 2, and not merely the examples described herein, may be advantageously input through the analog audio output channels using the described apparatus and method. One of skill in the art will appreciate the many types of devices and sensors that may provide such digital data, the devices or circuits that may be incorporated into a data source such as data source 214 to create a modulated data signal from such digital data, or devices that will produce control signals that will cause switch 216 to modulate the signal.

As mentioned, biometric data may be input to an audio device to be used with a health-related application. Such data might, for example, include a measure of a signal present between earpieces of a headphone due to brain activity, a signal derived from a user's heart rate, blood flow, muscle tension, or any other derivable biometric measurement. Other possible types of data that could be input from sensors might include temperature, humidity, barometric pressure and other environmental parameters.

Another possible use of the described apparatus and method is to validate a load device connected to the analog output port by means of an application on the audio device that performs an encrypted validation handshake with the load device using digital data. An uncommon sequence of voltage or current is sent to the load device, which has an associated data source, by the audio subsystem as a stimulus signal to which the audio device will expect a particular reply signal. The data source associated with the load device detects the stimulus signal as an instruction to begin a validation handshake, and returns a data signal to the audio device as described herein. If the audio device recognizes the returned data signal as the expected reply signal, the audio device recognizes the load device as valid. To prevent a third party from merely replicating the validation process by copying the encryption code, a "rotating code" might be used so that the data returned by the load device depends in a non-obvious way on a predetermined sequence of states that is encoded. For example, a pseudo-random binary sequence generated by a specific set of tap connections might be employed, with one state chosen at random from the set of possible states and sent by the audio device, and the load device having the same set of tap connections and able to send back the successive states that can be verified by the audio device.

Further, while a single analog output port having two channels, a stereo headphone with a microphone, and a speaker are described herein, the present approach is not limited to such embodiments, but may be used with an audio subsystem having any number of analog input or output channels and that may be connected to any device that connects to the audio output channel(s).

It is also expected that the described apparatus may be implemented in numerous ways, including as a circuit with separate components or embodied in a semiconductor device. Where elements are shown as connected, they may in some embodiments be coupled to each other through another element, for example, through another resistor. Different parameters for the components may be used depending on the particular application, or load devices of different resistance than indicated herein. One of skill in the art will appreciate how to determine what component values will be appropriate for a specific intended application.

These and other variations upon the embodiments are intended to be covered by the present disclosure, which is limited only by the appended claims.

What is claimed is:

1. A circuit for use with an analog audio output subsystem of an audio device, the analog audio output subsystem providing an analog audio signal from an output port to a load device and containing a means for producing a signal representing measured current flow through the load device, the circuit comprising:
   a resistive element connected to the output port in parallel with the load device such that the signal representing measured current flow through the load device also represents measured current flow through the resistive element;
   a switch for receiving a modulated digital signal from a data source and causing the current flow through the resistive element such that the current flow through the resistive element is representative of the modulated digital signal; and
   logic connected to the means for producing the signal representing measured current flow that demodulates the signal representing measured current flow to recover a digital signal encoded in the modulated digital signal.

2. The circuit of claim 1, wherein the means for producing a signal representing measured current flow through the load device measures an average of current flowing through the load device to determine characteristics of the load device, and the circuit further comprises a capacitor connected between the output port and the resistive element that passes changes in current flow in the resistive element to the output port and prevents such changes in current flow in the resistive element from changing the measurement of the average current flowing through the load device.

3. The circuit of claim 2 wherein the resistive element comprises a resistor, an inductor or a field effect transistor.

4. The circuit of claim 1 wherein the logic comprises a hardware circuit in the audio device.

5. The circuit of claim 1 wherein the logic comprises an application stored in memory in the audio device that provides instructions for a processor.

6. A circuit for use with an analog audio output subsystem of an audio device, the analog audio output subsystem providing an analog audio signal from an output port to a load device and containing a means for producing a signal representing measured current flow through the load device, the circuit comprising:
   a resistive element connected to the output port in parallel with the load device such that the signal representing measured current flow through the load device also represents measured current flow through the resistive element;
   a switch for producing a modulated digital signal in response to a control signal from a data source, and causing the current flow through the resistive element such that the current flowing through the resistive element is representative of the modulated digital signal; and
   logic connected to the means for producing the signal representing measured current flow that demodulates the signal representing measured current flow to recover a digital signal encoded in the modulated digital signal.

7. The circuit of claim 6, wherein the means producing a signal representing measured current flow through the load device measures an average of current flowing through the load device to determine characteristics of the load device, and the circuit further comprises a capacitor connected between the output port and the resistive element that passes changes in current flow in the resistive element to the output port and prevents such changes in current flow in the resistive element from changing the measurement of the average current flowing through the load device.

8. The circuit of claim 7 wherein the resistive element comprises a resistor, an inductor or a field effect transistor.

9. The circuit of claim 6 wherein the logic comprises a hardware circuit in the audio device.

10. The circuit of claim 6 wherein the logic comprises an application stored in memory in the audio device that provides instructions for a processor.

11. A method for use with an analog audio output subsystem of an audio device, the analog audio output subsystem providing an analog audio DC signal from an output port to a load device and containing a means for producing a signal representing measured current flow in a load device, the method comprising:
   receiving at the output port a current flowing through a resistive element coupled to the output port in parallel with the load device, the current from the resistive element due to a voltage applied to the resistive element and representative of a modulated digital signal, such that the signal representing the measured current flow in a load device also represents the measured current flow through the resistive element as well as the current flow through the load device; and
   demodulating the signal representing the measured current flow to recover the digital signal.

12. The method of claim 11 wherein the voltage applied to the resistive element is from a switch receiving a control signal from a data source.

13. The method of claim 11 wherein the resistive element comprises a resistor, an inductor or a field effect transistor.

14. The method of claim 11 wherein the voltage applied to the resistive element is from a data source.

15. The method of claim 12, further comprising passing the current flowing through the resistive element through a capacitor between the output port and the resistive element causing the means for measuring the current flowing through the load device to measure the current flowing through the resistive element as well as the current flowing through the load device.

* * * * *